United States Patent
Shimizu et al.

(10) Patent No.: US 6,343,002 B1
(45) Date of Patent: Jan. 29, 2002

(54) ELECTROCONDUCTIVE PASTE, LAMINATED CERAMIC CAPACITOR, AND METHOD FOR MANUFACTURING THE SAME

(75) Inventors: Yasushi Shimizu; Nagato Omori, both of Takefu (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/676,329

(22) Filed: Sep. 29, 2000

(30) Foreign Application Priority Data

Sep. 30, 1999 (JP) .......................................... 11-278558

(51) Int. Cl.[7] ................................................. H01G 4/06
(52) U.S. Cl. ................. 361/321.4; 361/321.5; 361/311; 361/313; 361/321.2
(58) Field of Search .......................... 361/321.4, 321.1, 361/313, 321.2, 321.5, 321.3, 311, 305, 306

(56) References Cited

U.S. PATENT DOCUMENTS

| | | | | |
|---|---|---|---|---|
| 4,725,573 A | * | 2/1988 | Mesters et al. | 502/245 |
| 5,536,594 A | * | 7/1996 | Galloway et al. | 429/103 |
| 5,600,533 A | * | 2/1997 | Sano et al. | 361/321.4 |
| 5,853,451 A | * | 12/1998 | Ishikawa | 75/367 |
| 5,910,881 A | * | 6/1999 | Ueno | 361/313 |
| 6,074,785 A | * | 6/2000 | Dansui et al. | 429/223 |
| 6,118,648 A | * | 9/2000 | Kojima et al. | 361/311 |
| 6,143,109 A | * | 11/2000 | Sano et al. | 156/89.16 |

FOREIGN PATENT DOCUMENTS

JP 08-246001 9/1996

\* cited by examiner

*Primary Examiner*—Dean A. Reichard
*Assistant Examiner*—Nguyen Ha
(74) *Attorney, Agent, or Firm*—Ostrolenk, Faber, Gerb & Soffen, LLP

(57) ABSTRACT

In an electroconductive paste comprising a nickel powder for use in forming internal electrodes of a laminated ceramic capacitor, particles of nickel powder contained in the electroconductive paste have an average particle size D of about 0.5 μm or less, and the crystal particle size dc of a nickel crystal contained in each particle of the nickel powder is made to be less than about 20% of the average particle size D.

8 Claims, 1 Drawing Sheet

ELECTROCONDUCTIVE PASTE, LAMINATED CERAMIC CAPACITOR, AND METHOD FOR MANUFACTURING THE SAME

BACKGROUND OF THE INVENTION

1. Field of the Invention

The present invention relates to an electroconductive paste containing a nickel powder which can be advantageously used to form internal electrodes of a laminated ceramic capacitor, to a laminated ceramic capacitor with internal electrodes formed by using this electroconductive paste, and to a manufacturing method therefor.

2. Description of the Related Art

FIG. 1 shows a cross-sectional view of a laminated ceramic capacitor 1 to which the present invention relates.

A laminated ceramic capacitor 1 is composed of a laminated body 3 having ceramic layers 2 comprising plural laminated dielectric ceramic bodies, and first and second external electrodes 4 and 5, located respectively at the two edges facing each other on this laminated body 3.

First internal electrodes 6 and second internal electrodes 7 are located in an alternate arrangement inside the laminated body 3. The first internal electrodes 6 are formed along plural specific interfaces between the ceramic layers 2 with respective edges exposed at one of the edges of the laminated body 3 so that they are electrically connected with the first external electrode 4. The second internal electrodes 7 are formed along plural specific interfaces between the ceramic layers 2 with respective edges exposed at the other edge of the laminated body 3 so that they are electrically connected with the second external electrode 5.

For such a laminated ceramic capacitor 1, it is becoming common to use nickel as an electroconductive material for the internal electrodes 6 and 7 in order to reduce the production cost.

The laminated ceramic capacitor 1 is, for example, manufactured in the following manner.

First, plural green ceramic sheets are prepared for forming the ceramic layers 2. Electroconductive paste films for the internal electrodes 6 or 7 are formed on specific green ceramic sheets by applying an electroconductive paste containing a nickel powder and an organic vehicle by a screen printing method or the like.

Next, the plural green ceramic sheets including those having electroconductive paste films formed accordingly are stacked, pressed, and then cut, if necessary. In this way, a raw laminated body is produced which comprises plural green laminated ceramic layers, and electroconductive paste films formed along specific interfaces between these green ceramic layers.

This green laminated body is then baked in a nonoxidizing atmosphere. Accordingly, the green ceramic layers as well as the electroconductive paste films are sintered. These electroconductive paste films thus form the internal electrodes 6 and 7.

The external electrodes 4 and 5 are then formed on the outer surfaces of the sintered laminated body so that they are electrically connected with either the internal electrodes 6 or 7.

During the baking step included in the method for manufacturing the above-described laminated ceramic capacitor 1, there are occasions in which delamination occurs between the ceramic layers 2 and the internal electrodes 6 and 7. Cracking would also occur in the laminated body 3. They are mainly caused by differences in shrinkage behavior of ceramic materials contained in the ceramic layers 2, and the shrinkage behavior of nickel, or a metal contained in the internal electrodes 6 and 7, during the baking step. More specifically, they are caused by the fact that the degree of shrinkage of nickel composing the internal electrodes 6 and 7 is larger than that of the ceramic materials composing the ceramic layers 2.

In recent years, improvements toward thinner ceramic layers 2, thinner electrodes 6 and 7, and increase in the number of layers of the ceramic layers 2 as well as the internal electrodes 6 and 7 have been in progress, along with the tendency toward smaller laminated ceramic capacitors 1 with larger capacities. To make such improvements possible, it is necessary to reduce the particle size of a nickel powder contained in an electroconductive paste for the internal electrodes 6 and 7. As a result, the proportion of the internal electrodes 6 and 7 in the overall laminated body 3, or the proportion of the nickel portion in the overall laminated body 3 becomes higher, which tends to make more prominent such problems of delamination and cracking described above.

It is effective to restrict the shrinkage of the nickel powder during the baking step to solve such problems. Conventionally, addition of a ceramic oxide or an organometallic compound to the electroconductive paste used in forming electrodes 6 and 7, as well as use of a nickel powder with a nickel crystal having a large crystal particle size, is employed to achieve this purpose.

However, if a ceramic oxide or an organometallic compound is added to the electroconductive paste, the ceramic oxide or the organometallic compound forms a solid solution in the ceramic layers 2 during the baking step, and may result in an adverse effect to the electric properties of the baked laminated ceramic capacitor 1.

On the other hand, when a nickel powder having a large crystal particle size is contained in the electroconductive paste, it tends to drastically shrink during the sintering at a high temperature described above, if the particles in the nickel powder are small. This would cause, contrary to expectation, problems of delamination and cracking to occur more often.

SUMMARY OF THE INVENTION

An object of the present invention is, therefore, to provide an electroconductive paste which can solve such problems as mentioned above.

Another object of the present invention is to provide a laminated ceramic capacitor having internal electrodes formed by using the above-mentioned electroconductive paste, and a manufacturing method therefor.

The inventors of the present invention focused on the crystal particle sizes of nickel crystals contained in nickel powder and hypothesized that choosing a specific value for the crystal particle size in relation with the average particle size of the nickel powder would act as an effective means to restrict drastic shrinkage of the nickel powder during sintering. The inventors of the present invention performed intensive research to solve the above-mentioned problems and discovered a phenomenon that as the crystal particle size of a nickel crystal becomes smaller compared with the average particle size of the nickel powder, shrinkage of the nickel powder during sintering occurs more uniformly and is thus less liable to cause drastic shrinkage during sintering as compared with a case in which a crystal having a larger crystal particle size is used. The present invention has thus been achieved.

Based on this, an electroconductive paste according to the present invention has a nickel powder dispersed in an organic vehicle, wherein the nickel powder has an average particle size of about 0.5 μm or less, and the crystal particle size of nickel crystals contained in each particle of the nickel powder is less than about 20% of the average particle size.

The invention is also directed to a laminated ceramic capacitor having a laminated body comprising plural laminated ceramic layers and internal electrodes located along specific interfaces between these ceramic layers, wherein the internal electrodes are obtained by baking the above-described electroconductive paste.

The invention is also directed to a method for manufacturing a laminated ceramic capacitor. In this method for manufacturing a laminated ceramic capacitor, a raw laminated body comprising plural green laminated ceramic layers, and electroconductive paste films formed along the specific interfaces between the raw ceramic layers by using the above-described electroconductive paste is prepared, the raw ceramic layers are sintered by baking the green laminated body, the electroconductive paste films are sintered at the same time to form internal electrodes for a sintered laminated body, and external electrodes are formed on the outer surfaces of the sintered laminated body so that they are electrically connected with the internal electrodes.

DESCRIPTION OF THE PREFERRED EMBODIMENTS

An electroconductive paste according to the present invention, for example, has a nickel powder dispersed in an organic vehicle comprising an organic binder, an organic solvent, etc.

Figure 1:
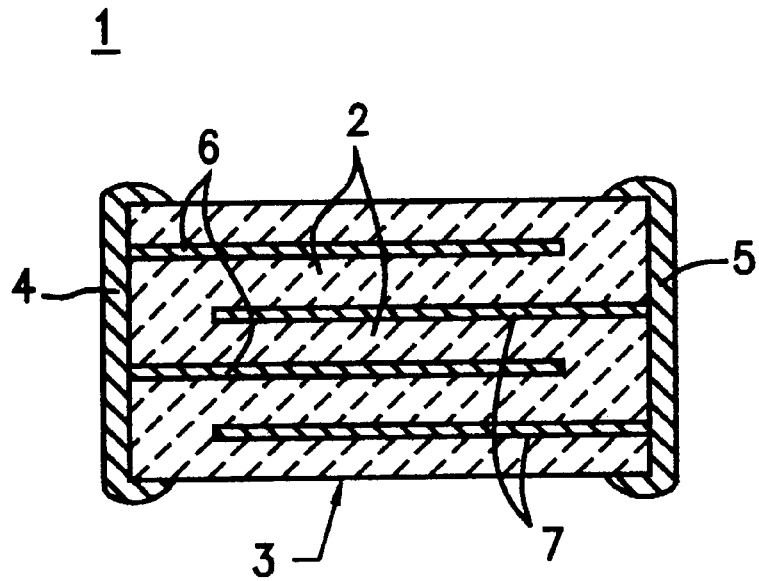
FIG. 1 is a cross-sectional view illustrating a laminated ceramic capacitor which is of interest to the present invention.
Figure 2:
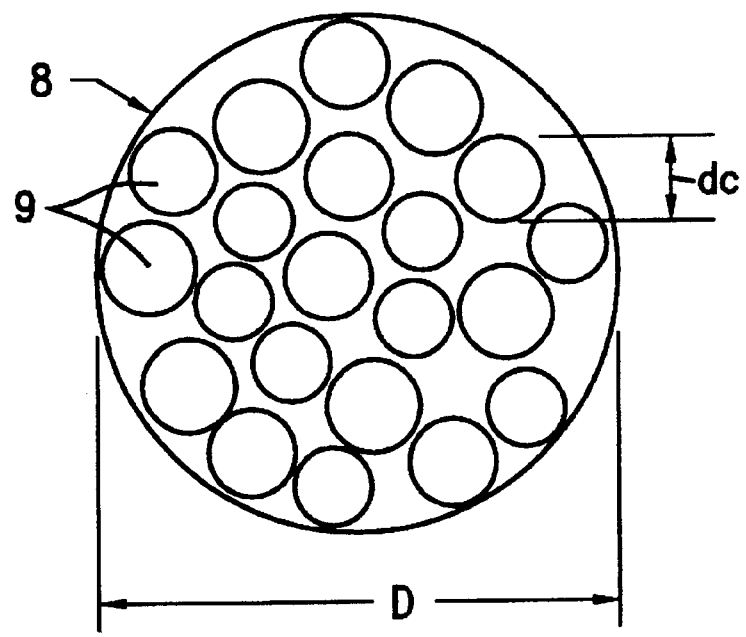
FIG. 2 is an enlarged cross-sectional view illustrating a particle of nickel powder 8 contained in the electroconductive paste according to the present invention.

FIG. 1 illustrates a particle of nickel powder 8 chosen arbitrarily from such an electroconductive paste. The particle of nickel powder 8 contains nickel crystals 9. In FIG. 2, the average particle size of the particles of nickel powder 8 is represented by D, and the crystal particle size for each nickel crystal 9 is represented by dc. The present invention is characterized in that the average particle size D for the particle of nickel powder 8 is about 0.5 μm or less, and the crystal particle size dc for the nickel crystal 9 is less than about 20% of the above-mentioned average particle size D.

Such an electroconductive paste is advantageously used for forming the internal electrodes 6 and 7 in the laminated ceramic capacitor 1 shown in the above-mentioned FIG. 2. The structure of the laminated ceramic capacitor 1 is the same as described in the above-mentioned explanation.

The method for manufacturing the laminated ceramic capacitor 1 is also substantially the same as the above-described conventional manufacturing method except that an electroconductive paste having characteristics described above is used as the electroconductive paste for use in forming the internal electrodes 6 and 7.

Accordingly, a green laminated body comprising plural green laminated ceramic layers for forming the ceramic layers 2 is prepared, and electroconductive paste films formed along specific interfaces between the raw ceramic layers by using an electroconductive paste, the green ceramic layers are sintered by baking the green laminated body, the electroconductive paste films are sintered at the same time to form the internal electrodes 6 and 7 for the sintered laminated body 3, and the external electrodes 4 and 5 are formed on the outer surfaces of the sintered laminated body 3 so that they are electrically connected with the internal electrodes 6 and 7. The laminated ceramic capacitor is thus completed.

In the above-described explanation, green ceramic sheets with the electroconductive paste films formed thereon were laminated to obtain the above-described green laminated body. It is also possible to repeat application of a ceramic slurry for forming a green ceramic layer, and application of an electroconductive paste for forming an electroconductive paste film. Furthermore, an electroconductive paste film may be formed by applying an electroconductive paste on green ceramic sheets during the lamination work of the sheets.

The following is an experimental example to confirm the effect of the electroconductive paste according to the present invention.

First, a ceramic material having $BaTiO_3$ as a major component, an organic binder, an organic solvent, a plasticizer and a dispersant were mixed at a specified ratio, and the mixture was subjected to a wet type dispersion treatment with a ball mill to obtain a ceramic slurry. Then the ceramic slurry was applied onto a PET (polyethylene terephthalate) film by a doctor blade process to form a green ceramic sheet having a thickness of 9.0 μm after drying.

Next, an electroconductive paste was applied onto the above-described green ceramic sheets by a screen printing method to form electroconductive paste films for internal electrodes so that they had a pattern which allowed a chip-shaped laminated body obtained afterward to have a flat surface having dimensions of 3.2 mm×1.6 mm after cutting and baking, and so that they had thicknesses of 1.8 μm, 2.5 μm, and 3.0 μm after drying.

It is noted that the above-mentioned electroconductive paste contained 50% by weight of a nickel powder, 40% by weight of an organic vehicle, a resinous solution obtained by dissolving 10% by weight of an organic binder in an organic solvent, and the balance being composed of a dispersant, a thickener, etc.

For the of nickel powders in total were independently used, that is, two kinds each having an average particle size of 0.5 μm with a crystal particle size of 200 nm or 80 nm, two kinds each having an average particle size of 0.2 μm with a crystal particle size of 100 nm or 30 nm, and the other two kinds each having an average particle size of 0.1 μm with a crystal particle size of 50 nm or 15 nm.

The above-mentioned average particle size was obtained by taking a photograph of a nickel powder with a scanning electron microscope, subjecting the powder image to processing in an image processor, calculating circle-equivalent diameters, and then calculating an arithmetic mean value thereof. The crystal particle size was calculated by the Hall method from the diffraction peaks of nickel obtained from the X-ray diffraction of a nickel powder.

The green ceramic sheets with electroconductive paste films printed on as described above were peeled off the PET film. Two hundred of these green ceramic sheets were stacked, placed in a mold, and were pressed. The pressed laminated body block was then cut into a specified size to produce green laminated bodies in the shape of chips for laminated ceramic capacitors.

These green laminated bodies were then subjected to a degreasing treatment in an nitrogen atmosphere at a temperature of 350° C. for 10 hours, followed by a baking treatment in an atmosphere of a mixture of $N_2/H_2/H_2O$ while holding them under an oxygen partial pressure of $10^{-6}$ to $10^{-7}$ MPa and at a temperature of 1,200° C. for 2 hours.

Observations were made of the exterior appearance of each of 1,000 of laminated bodies after the baking treatment to determine whether structural defects such as delamination, cracking or the like could be found.

Table 1 shown below indicates the number of laminated bodies having such structural defects in relation to the average particle size D of a nickel powder used for an electroconductive paste, the crystal particle size dc of the nickel crystal, the ratio dc/D of the crystal particle size dc to the average particle size D, and the thickness of the electroconductive paste film after drying and before baking.

TABLE 1

| Average particle size D ($\mu$m) | Crystal particle size dc (nm) | dc/D | Paste film thickness after drying ($\mu$m) | Number of structural defects occurring |
|---|---|---|---|---|
| 0.5 | 200 | 0.4 | 3.0 | 55/1,000 |
|  | 80 | 0.16 | 3.0 | 0/1,000 |
| 0.2 | 100 | 0.5 | 2.5 | 250/1,000 |
|  | 36 | 0.18 | 2.5 | 0/1,000 |
| 0.1 | 50 | 0.5 | 1.8 | 630/1,000 |
|  | 15 | 0.1 | 1.8 | 0/1,000 |

As can be understood from Table 1, structural defects occurred in a relatively large number of laminated chips when the ratio dc/D of the crystal particle size dc to the average particle size D was 0.2 or more, whether the average particle size D of the nickel powder was 0.1 $\mu$m, 0.2 $\mu$m or 0.5 $\mu$m. On the other hand, no structural defects occurred when the ratio dc/D was less than about 0.2.

When the crystal particle size dc is compared with the average particle size D of the nickel powder as shown above, the sintering initiation temperature in the baking of a nickel powder tends to be lower compared with the case in which the crystal particle size dc is larger. The temperature thus lowered makes it more difficult to cause drastic shrinkage during sintering. This is because such a smaller crystal particle size dc causes a larger degree of lattice defects and lattice distortion to produce a larger volume diffusion at the surface of nickel powder at the time of baking. By comparison, when the crystal particle size dc is larger, shrinkage at sintering is made difficult until the temperature is raised to a higher range. Since the diffusion coefficient becomes larger as the temperature is raised to such a higher range, the shrinkage rate during sintering becomes larger in a higher temperature range.

According to the electroconductive paste described in the present invention, employing a nickel powder with the ratio dc/D of the crystal particle size dc to the average particle size D which is less than about 0.2, with the average particle size D of the nickel powder being about 0.5 $\mu$m or less, can provide a uniform shrinkage of a nickel powder at sintering during the temperature increase in the baking step, with the result that a structural defect that may occur during the baking step can be restricted.

As mentioned above, in an electroconductive paste according to the present invention, the nickel powder has an average particle size of about 0.5 $\mu$m or less, and the crystal particle size of a nickel crystal contained in each particle of the nickel powder is less than about 20% of the average particle size. Shrinkage during sintering of a nickel powder thus can be generated uniformly during the temperature increase in the baking step as is clearly shown from the above-mentioned experimental results, making it less liable to shrink drastically during sintering.

Accordingly, structural defects such as delamination and cracking can be restricted from occurring in a laminated body during the baking step for obtaining the laminated body for a laminated ceramic capacitor when internal electrodes of the laminated ceramic capacitor are formed by using an electroconductive paste according to the present invention. Thus, it is possible to increase the yield rate as well as the reliability, even when thinner ceramic layers, thinner internal electrodes and greater numbers of ceramic layers and the internal electrodes are realized to achieve a smaller laminated ceramic capacitor with a larger capacity. The present invention is very effective for obtaining a smaller laminated ceramic capacitor with a larger capacity.

What is claimed is:

1. An electroconductive paste comprising a nickel powder dispersed in an organic vehicle, wherein said nickel powder has an average particle size of not more than about 0.5 $\mu$m, and a nickel crystal contained in each particle of said nickel powder has a crystal particle size of less than about 20% of said average particle size.

2. An electroconductive paste according to claim 1, wherein the crystal particle size of a nickel crystal contained in each particle of said nickel powder is less than about 18% of said average particle size.

3. An electroconductive paste according to claim 2, wherein said nickel powder has an average particle size of not more than about 0.2 $\mu$m.

4. A laminated ceramic capacitor having a laminated body comprising plural laminated ceramic layers and internal electrodes located at a plurality of interfaces between adjacent ceramic layers, wherein said internal electrodes comprise a baked electroconductive paste according to claim 3.

5. A laminated ceramic capacitor having a laminated body comprising plural laminated ceramic layers and internal electrodes located at a plurality of interfaces between adjacent ceramic layers, wherein said internal electrodes comprise a baked electroconductive paste according to claim 2.

6. A laminated ceramic capacitor having a laminated body comprising plural laminated ceramic layers and internal electrodes located at a plurality of interfaces between adjacent ceramic layers, wherein said internal electrodes comprise a baked electroconductive paste according to claim 1.

7. A method for manufacturing a laminated ceramic capacitor comprising:
   providing a green laminated body comprising a plurality of green laminated ceramic layers, and a film of an electroconductive paste according to claim 1 disposed at least two interfaces between adjacent green ceramic layers;
   sintering said green ceramic layers by baking said green laminated body;
   sintering said electroconductive paste films at the same time to form internal electrodes for a sintered laminated body; and providing a pair of external electrodes on the outer surfaces of said sintered laminated body electrically connected with said internal electrodes.

8. A method for manufacturing a laminated ceramic capacitor comprising:

provided a green laminated body comprising a plurality of green laminated ceramic layers, and a film of an electroconductive paste according to claim 2 disposed at least two interfaces between adjacent green ceramic layers;

sintering said green ceramic layers by baking said green laminated body;

sintering said electroconductive paste films at the same time to form internal electrodes for a sintered laminated body; and providing a pair of external electrodes on the outer surfaces of said sintered laminated body electrically connected with said internal electrodes.

* * * * *